United States Patent [19]
Sasai et al.

[11] Patent Number: 4,744,946
[45] Date of Patent: May 17, 1988

[54] MATERIALS FOR STORAGE OF HYDROGEN

[75] Inventors: Takashi Sasai, Gunma; Hisao Konno, Chofu; Noboru Hayami; Kenichi Kobayashi, both of Gunma; Susumu Uoya, Gunma; Koichi Oku, Matsudo, all of Japan

[73] Assignee: Japan Metals and Chemicals Co., Ltd., Tokyo, Japan

[21] Appl. No.: 928,692

[22] Filed: Nov. 7, 1986

Related U.S. Application Data

[63] Continuation of Ser. No. 731,344, May 6, 1985, abandoned, which is a continuation of Ser. No. 577,892, Feb. 7, 1984, abandoned.

[30] Foreign Application Priority Data

Feb. 9, 1982 [JP] Japan .................................. 58-20192
Sep. 27, 1983 [JP] Japan .................................. 58-179032

[51] Int. Cl.$^4$ ............................................. C22C 19/03
[52] U.S. Cl. .................................. 420/443; 420/445; 420/900; 423/644
[58] Field of Search ............... 420/454, 434, 900, 443, 420/459, 460; 423/644, 648 R

[56] References Cited

U.S. PATENT DOCUMENTS

| | | | |
|---|---|---|---|
| 4,152,145 | 5/1979 | Sandrock | 420/455 |
| 4,222,770 | 9/1980 | Osumi et al. | 420/455 |
| 4,249,940 | 2/1981 | Sandrock et al. | 420/455 |
| 4,396,576 | 8/1983 | Osumi et al. | 420/455 |
| 4,409,180 | 10/1983 | Sandrock et al. | 420/455 |
| 4,421,718 | 12/1983 | Osumi et al. | 420/443 |

FOREIGN PATENT DOCUMENTS

| | | | |
|---|---|---|---|
| 130434 | 10/1979 | Japan | 420/900 |
| 62942 | 5/1981 | Japan | 420/900 |
| 19347 | 2/1982 | Japan | 420/900 |
| 140847 | 8/1982 | Japan | 420/900 |
| 140848 | 8/1982 | Japan | 420/900 |
| 1040 | 1/1983 | Japan | 420/900 |

*Primary Examiner*—Christopher W. Brody
*Attorney, Agent, or Firm*—Parkhurst & Oliff

[57] ABSTRACT

A material for storage of hydrogen, consisting essentially of an alloy represented by the following general formula:

$$LmNi_a$$

where Lm signifies rare earth metals which contain 40 to 70% by weight of lanthanum, 0.1 to 20% by weight of cerium and other metals such as neodymium, praseodymium, and/or samarium; and a signifies a range of $4.8 < a < 5.5$. Thus, improved hydrogen absorption under relatively low pressure at room temperatures and also improved hydrogen absorption pressure and release equilibrium pressure can be provided.

6 Claims, 6 Drawing Sheets

MATERIALS FOR STORAGE OF HYDROGEN

This is a continuation of application Ser. No. 731,344, filed May 6, 1985, now abandoned, which in turn is a continuation of Ser. No. 577,892, filed Feb. 7, 1984, now abandoned.

BACKGROUND OF THE INVENTION

This invention relates to materials for storage of hydrogen and, more particularly, to materials for storage of hydrogen which can be produced from rare earth metal alloys.

Materials for storage of hydrogen are in general required to have in addition to the following physical properties:

(1) a ready activation,
(2) a large quantity of hydrogen storage,
(3) small hysteresis, and
(4) flatness of a plateau, a good probability of being produced from plentiful, inexpensive materials.

In the past, materials such as titanium-iron alloys, magnesium alloys, and lanthanum pentanickel or Mm-nickel alloys (Mm designates mischmetals) have been proposed for storage of hydrogen. Among these are particularly noted the rare earth metal alloys.

The lanthanum pentanickel is advantageous since it exhibits a large amount of hydrogen that is absorbed and desorbed and relatively fast hydrogen absorption and release properties. On the other hand, the lanthanum pentanickel suffers from a drawback in that the lanthanum of the material is expensive and it is difficult to employ it in a practical use in economy.

The Mm-nickel alloys have been developed to improve the economy of the lanthanum of the lanthanum pentanickel. The Mm generally contains 40 to 50% by weight of cerium, 20 to 30% by weight of lanthanum, and other various metals such as neodymium, praseodymium, and samarium. The mischmetal pentanickel is activated at room temperature, but necessitate a high pressure hydrogen of 100 kg/cm² or higher and has a difficulty of practically employing due to large hysteresis.

In order to overcome this difficulty, a hydrogen storage material which is produced by mixing Mm-nickel alloys with a third element such as aluminum, further mixing the resulting mixture with fourth other metal to decrease the absorption and release pressures at a room temperature and to reduce the hysteresis has been proposed. However, the addition of the third and fourth elements causes another disadvantage of a considerably small amount of hydrogen absorption.

SUMMARY OF THE INVENTION

It is an object of this invention to provide materials for storage of hydrogen which show improved hydrogen absorption under relatively low pressure at room temperature and also the decreasing of the difference between hydrogen absorption and desorption pressure (so-called "a hysteresis").

The material for storage of hydrogen in this invention can be readily activated at room temperature, increased in hydrogen absorption amount, accelerated in hydrogen absorbing and desorbing velocities, reduced in a hysteresis and incorporated with flatness of a plateau by containing rare earth-metal alloys in the material.

These and other objects and features will become more apparent from the following description of the preferred embodiments of the present invention when read in connection with the accompanying drawings.

BRIEF DESCRIPTION OF THE DRAWINGS

FIG. 1 shows the relationship between Lm-nickel alloy and Mm-nickel alloy;

FIG. 2 shows the relationship between Lm-nickel-aluminum and Mm-nickel-aluminum;

FIG. 3 shows the relationship between $LmNi_{4.8}Al_{0.2}$ alloy, $LaNi_5$ and $MmNi_{14.7}Al_{0.3}$;

FIG. 4 shows the relationship between $LmNi_{4.8}Mn_{0.2}$ alloy, $LmNi_{4.8}Fe_{0.2}$ alloy, $LmNi_{4.8}Cr_{0.2}$ alloy, and $MmNi_{4.15}Fe_{0.85}$;

FIG. 5 shows the relationship between $LmNi_{4.78}Mn_{0.42}Co_{0.05}$ alloy, $LmNi_{4.73}Mn_{0.53}Zr_{0.05}$ alloy and $LmNi_{5.05}Mn_{0.1}Al_{0.1}$ alloy; and FIG. 6 shows the relationship between $LmNi_{4.75}Mn_{0.2}V_{0.05}$ alloy and $LmNi_{4.75}Al_{0.2}V_{0.05}$ alloy.

DESCRIPTION OF THE PREFERRED EMBODIMENTS

Figure 1:
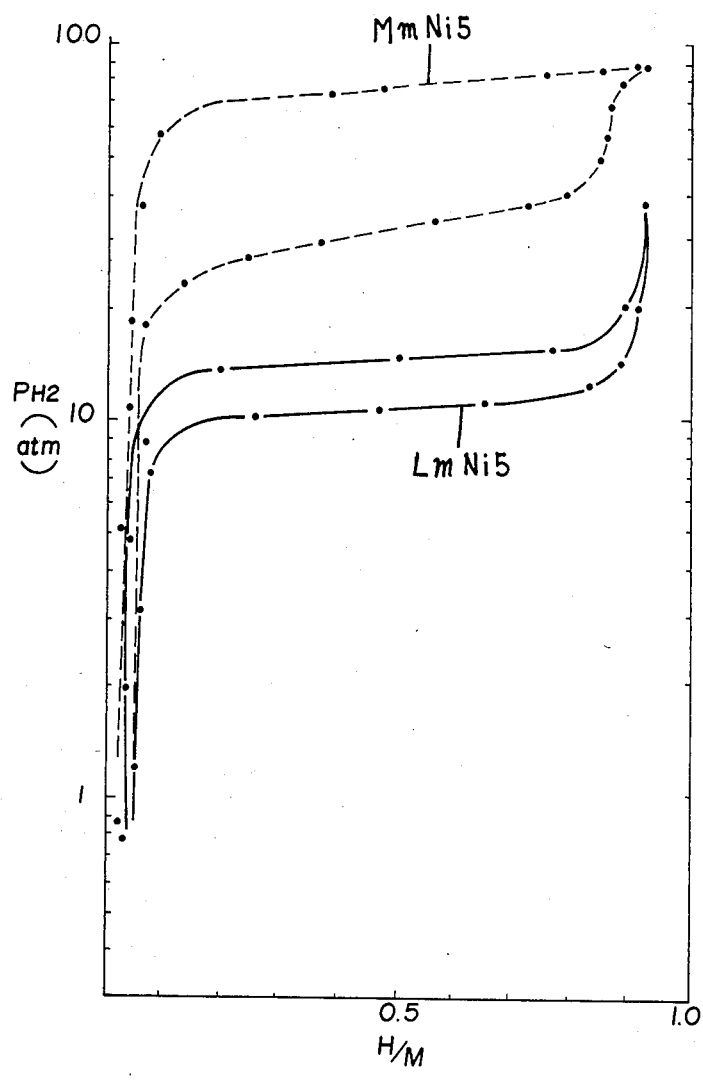
FIGS. 1 to 6 are graphs showing the relationship between hydrogen absorption and release amounts of materials for storage of hydrogen and equilibrium pressure.

A first embodiment of the hydrogen storage material according to the present invention is produced from an alloy which can be represented by the general formula:

$$LmNi_a$$

where Lm represents rare earth-metals which are composed of 40 to 70% by weight of lanthanum, 0.1 to 20% by weight of cerium and other metals such as neodymium, praseodymium, and samarium, and a is in a range of $4.8 < a < 5.5$.

A second embodiment of the hydrogen storage material according to the present invention is produced from an alloy which can be represented by the general formula:

$$LmNi_{a-x}A_x$$

where Lm represents rare earth-metals which are composed of 40 to 70% by weight of lanthanum, 0.1 to 20% by weight of cerium and other metals such as neodymium, praseodymium, and samarium; A is a type of metal selected from the group consisting of aluminum, manganese, iron chromium; and a is in a range of $4.8 < a < 5.5$, and x = 0.01 to 2.0.

A third embodiment of the hydrogen storage material according to the present invention is produced from an alloy which can be represented by the general formula:

$$LmNi_{a-x}A_yB_z$$

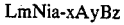

where Lm represents rare earth-metals which are composed of 40 to 70% by weight of lanthanum, 0.1 to 20% by weight of cerium and other metals such as neodymium, praseodymium, and samarium; A is a type of metal selected from the group consisting of aluminum, manganese and iron; B is a type of metal selected from the group consisting of manganese (except when A represents manganese), cobalt, zirconium and vanadium; a is in a range of $4.8 < a < 5.5$, and x = y + z, where y and z = 0.01 to 2.0.

The Lm used in the hydrogen storage material according to the present invention can be simply produced by removing the cerium from the material in the step of producing Mm (which is composed of approx. 50% by weight of cerium and 20 to 30% by weight of lanthanum) which is sold commercially.

More specifically, a bastnasite or monazite which is produced in nature and refined is roasted, extracted with hydrochloric acid, filtered, and most of the cerium is precipitated and separated. The resulting Lm solution which contains less cerium, thus obtained is further precipitated with ammonium hydroxide to produce as hydroxide Lm, the precipitate is further chlorided or fluorided, dissolved and electrolyzed by salting.

The Lm thus obtained and nickel metal are heated and melted in a conventional high frequency furnace or a tungsten electrode arc melting furnace in a vacuum or in an inert gas atmosphere of argon or the like, then heat treaated, and pulverized.

It is, in this case, preferable that the Lm highly contain the lanthanum and less contain the cerium, but 40 to 70% by weight of the lanthanum and 0.1 to 20% by weight of the cerium are contained to eliminate the complicated and expensive steps of separating and refining the lanthanum. Particularly when the cerium is contained 20% by weight or more, it is not preferred since the pressure of the activation is high and the pressure of absorption and release of hydrogen is high and the hysteresis is large.

When the x in the general formula for the second embodiment of the material for storage of hydrogen and x, y and z in the general formula for the third embodiment of the material for storage of hydrogen become 2.0 or larger, the reduction in the hydrogen storage amount and the flatness of plateau are obstructed. When a in the general formulae for all embodiments is larger than 5.5 or smaller than 4.8, hydrogen absorption decreases, and the material is unstably hydrogenated, and feasibly deteriorated due to the repeated absorption and desorption of hydrogen by the hydrogen storage material. Thus, a in the general formulae is necessarily defined in a range of $4.8 < a < 5.5$.

The present invention will now be described by experiment examples.

Experiment Example 1

After cerium was partly separated from refined bastnasite (which contained 49% by weight of cerium oxide, 32% by weight of lanthanum oxide and other metal oxides), predetermined amounts of Lm (which contained 50% by weight of lanthanum, 3% by weight of cerium, 35% by weight of neodymium, 10% by weight of praseodymium and samarium and the like) produced by a melting electrolysis by salting and metallic nickel were arc melted in an argon atmosphere to produce Lm-pentanickel, and the product was then pulverized into 9 to 100 mesh in atmosphere.

Approx. 5 g. of the pulverized product was filled in a reaction vessel, the vessel was evacuated by a rotary pump at room temperature for approx. 1 hour. Then, hydrogen gas was introduced at 30 kg/cm$^2$ into the vessel and activated in the vessel.

Subsequently, after the hydrogen gas was exhausted from the vessel, the hydrogen absorption and desorption amounts at 30° C. and the relationship between the amounts and the equilibrium pressure were examined, and the result was as shown by solid curves in FIG. 1.

In comparison, Mm (which contained 52% by weight of cerium, 27% by weight of lanthanum, 15% by weight of neodymium, 5% by weight of praseodymium and cerium and the like) was activated in the same manner as the above-described process, and the Mm exhibited no activation at room temperatures with 30 kg/cm$^2$ of hydrogen gas. It was necessary to cool the material once at zero degrees and to introduce the hydrogen gas at approx. 90 kg/cm$^2$. The hydrogen absorption and desorption amounts and the relationship between the amounts and the equilibrium pressure were as designated by broken curves in FIG. 1.

As apparent from FIG. 1, the equilibrium properties of the material for storage of hydrogen of the invention, i.e., the hydrogen pressure of absorbing and desorbing hydrogen by the material for storage of hydrogen were remarkably decreased, and the material can be sufficiently employed in a practical use. The hysteresis of the difference of the equilibrum pressure between the hydrogen absorption and desorption of the material for storage of hydrogen is largely decreased, and the flatness of the plateau is significantly improved.

Experiment Example 2

LmNi$_{4.7}$Al$_{0.3}$ alloy was produced by adding aluminum to the same material as that produced in Experiment Example 1 and activated in the same manner as in Experiment Example 1. Then, the hydrogen absorption and desorption amounts at 30° C. and the relationship between the amounts and the equilibrium pressure of the product were examined, and the results were as designated by solid curves in FIG. 2.

Figure 2:
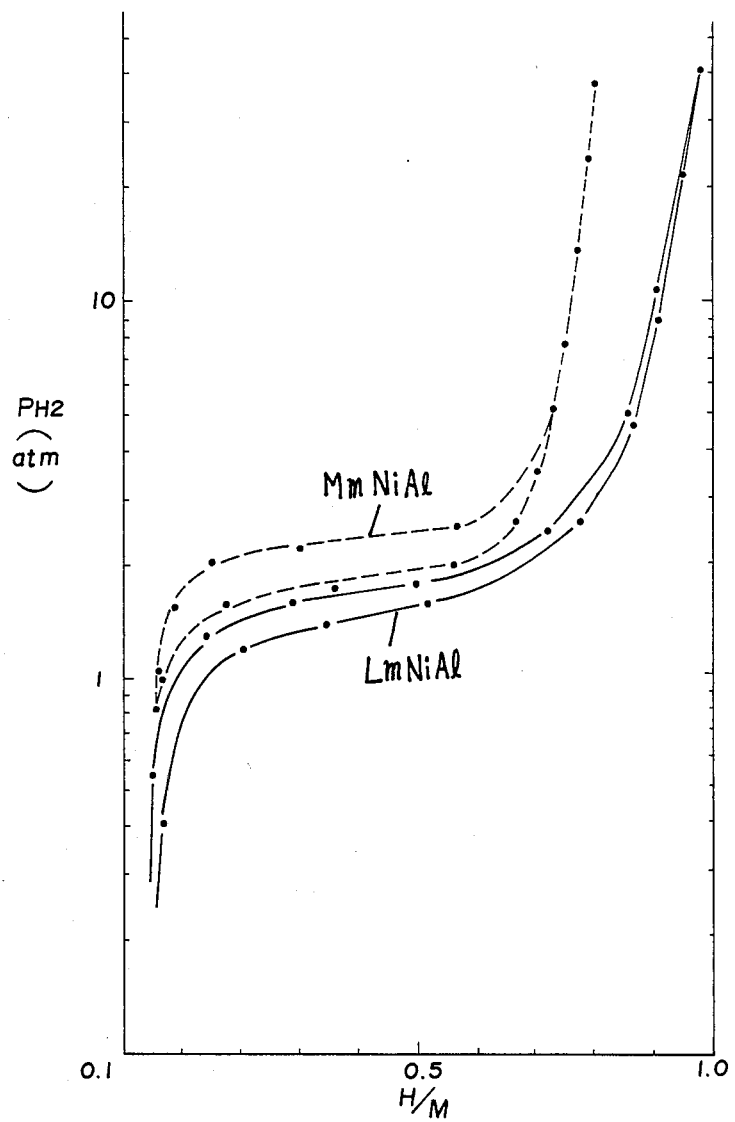

In comparison, MmNi$_{4.4}$Al$_{0.6}$ alloy produced by the Mm which contained as a row material approx. 52% by weight of cerium was activated, the hydrogen absorption and desorption amounts at 30° C. and the relationship between the amounts and the equilibrium pressure were designated by broken curves in FIG. 2.

In the past, when the conventional material for storage of hydrogen composed of Mm-nickel alloy was produced by adding a third element such as aluminum and an other fourth element to the material, the material should have exhibited hydrogen absorption properties as designated by broken curves in FIG. 2, i.e., the material should have absorbed and desorbed hydrogen pressure at room temperature in a practical use, and exhibited small hysteresis, but the material suffered from a drawback that the hydrogen absorption amount decreased.

However, in the material for storage of hydrogen of the present invention, it is observed that the equilibrated absorption and desorption pressures of the hydrogen is decreased, as shown by solid lines in FIG. 2, substantially to approx. 2 kg/cm$^2$ at 30° C. with the addition amount of substantially ½ of the aluminum as compared with the conventional one, and the hysteresis can be further reduced.

Further, the decrease in the hydrogen absorption amount of the drawback of the case that the aluminum was added to the conventional Mm-nickel alloy can be improved, the absorption and desorption pressures, hysteresis and flatness of the plateau in the Mm-nickel alloy can be further improved, and the material for storage of hydrogen of the invention is adapted for converting energy of a heat pump or a chemical engine.

Experiment Example 3

After cerium was partly separated from refined bastnasite (which contained 49% by weight of cerium oxide, 32% by weight of lanthanum oxide and other metals), predetermined amounts of Lm (which contained 50% by weight of lanthanum, 3% by weight of cerium, 35% by weight of neodymium, 10% by weight of praseodymium and samarium and the like) produced by a melting electrolysis by salting, metallic nickel and metal aluminum were arc melted in an argon atmosphere to produce $LmNi_{4.8}Al_{0.2}$, the product was then heat treated at 1,000° C. for 8 hours, and the product was then pulverized into 9 to 100 mesh in atmosphere.

Approx. 5 g. of the pulverized product was filled in a reaction vessel, the vessel was evacuated by a rotary pump at room temperature for approx. 1 hour. Then, a high purity hydrogen gas (preferably 99.99% pure) was introduced at 30 kg/cm² into the vessel and activated in the vessel.

Subsequently, after the hydrogen gas was exhausted from the vessel, the hydrogen absorption and desorption amounts at 30° C. and the relationship between the amounts and the equilibrium pressure were examined, and the result was as shown by solid curves in FIG. 3 (which is hereafter termed "PTC view").

In comparison, Mm which contained approx. 52% by weight of cerium was treated in the same manner as before to obtain $MmNi_{4.7}Al_{0.3}$, and the PTC views of the product at 30° C. and of lanthum pentanickel are designated.

Figure 3:
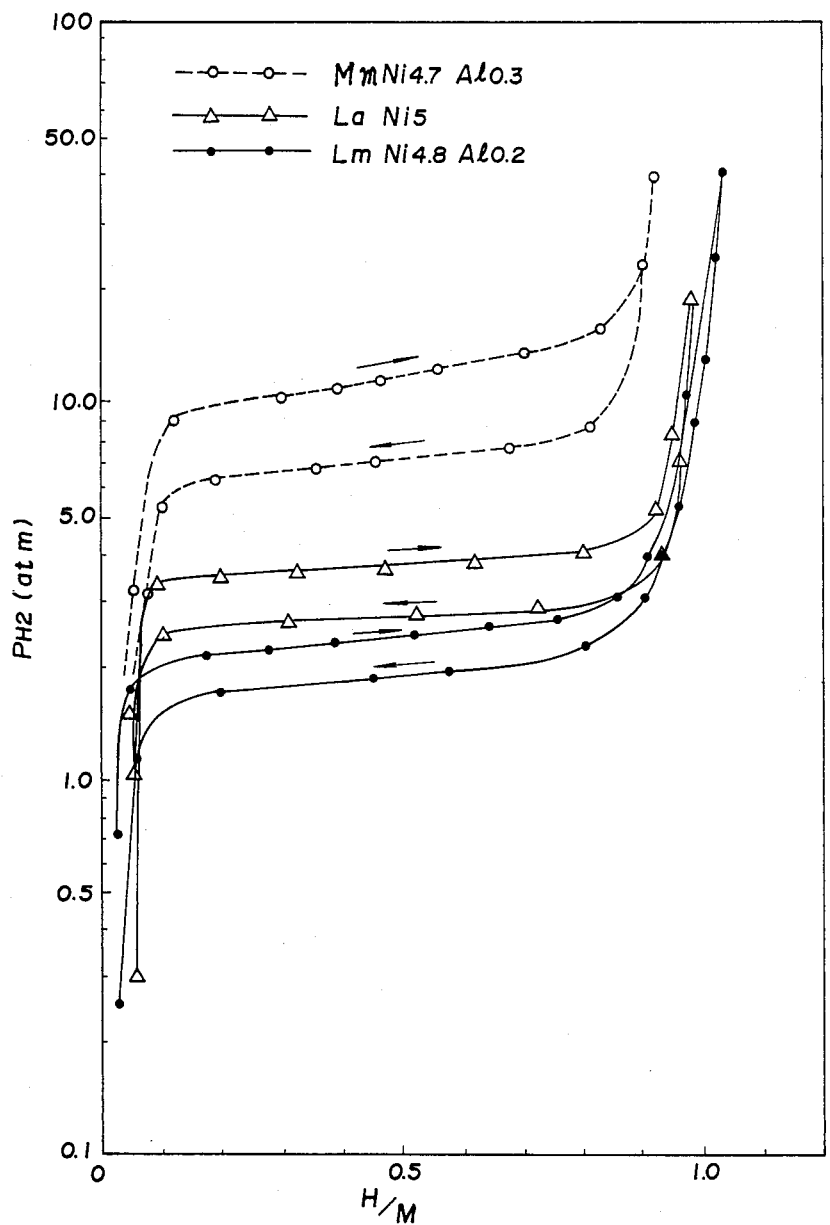

As apparent from FIG. 3, it is observed that the $LmNi_{4.8}Al_{0.2}$ alloy exhibited a decrease in the hydrogen desorption pressure at 30° C. to approx. 2 atmosphere absolute, though the amount of addition of aluminum is less, and the hydrogen absorption amount $H/M=1.04$ under a pressure of 40 atmosphere absolute increases.

On the other hand, $MmNi_{4.7}Al_{0.3}$ alloy decreased the amount of added aluminum as compared with Mm-nickel alloy sold in the market, namely, $MmNi_{4.5}Al_{0.5}$. Even in this case, the maximum hydrogen absorption amount under a pressure of 40 atmosphere solution was small of 0.93, and the hydrogen desorption pressure of plateau at 30° C. was high of approx. 7 atmosphere absolute.

Further, the hysteresis factor ($Hf=ln\{Pa/Pd\}$, where Pa is the absorption plateau pressure, and Pd is the desorption plateau pressure) of $LmNi_{4.8}Al_{0.2}$ alloy was 0.23, and the factor of $MmNi_{4.7}Al_{0.3}$ was large of 0.52.

In comparison with the lanthanum pentanickel of the conventional representative rare earth-metal alloy, the hysteresis factor was small (lanthanum pentanickel alloy, $Hf=0.32$), and the hydrogen absorption amount is superior but not deteriorated. In addition, the amount of added aluminum was less than half of that of the conventional Mm-nickel alloy, and the hydrogen absorption and desorption pressures could be effected to the value corresponding to that of the lanthanum pentanickel.

Experiment Example 4

$LmNi_{4.8}Mn_{0.2}$ alloy, $LmNi_{4.8}Fe_{0.2}$ alloy and $LmNi_{4.8}Cr_{0.2}$ alloy obtained by adding manganese, iron and chromium instead of the aluminum in the Experiment Example 3 were activated in the same manner as the Experiment Example 1. Then, the PTC view at 30° C. was obtained, and the results were as designated in FIG. 4. In comparison, PTC view of $MmNi_{4.15}Fe_{0.85}$ alloy at 30° C. was attached.

Figure 4:
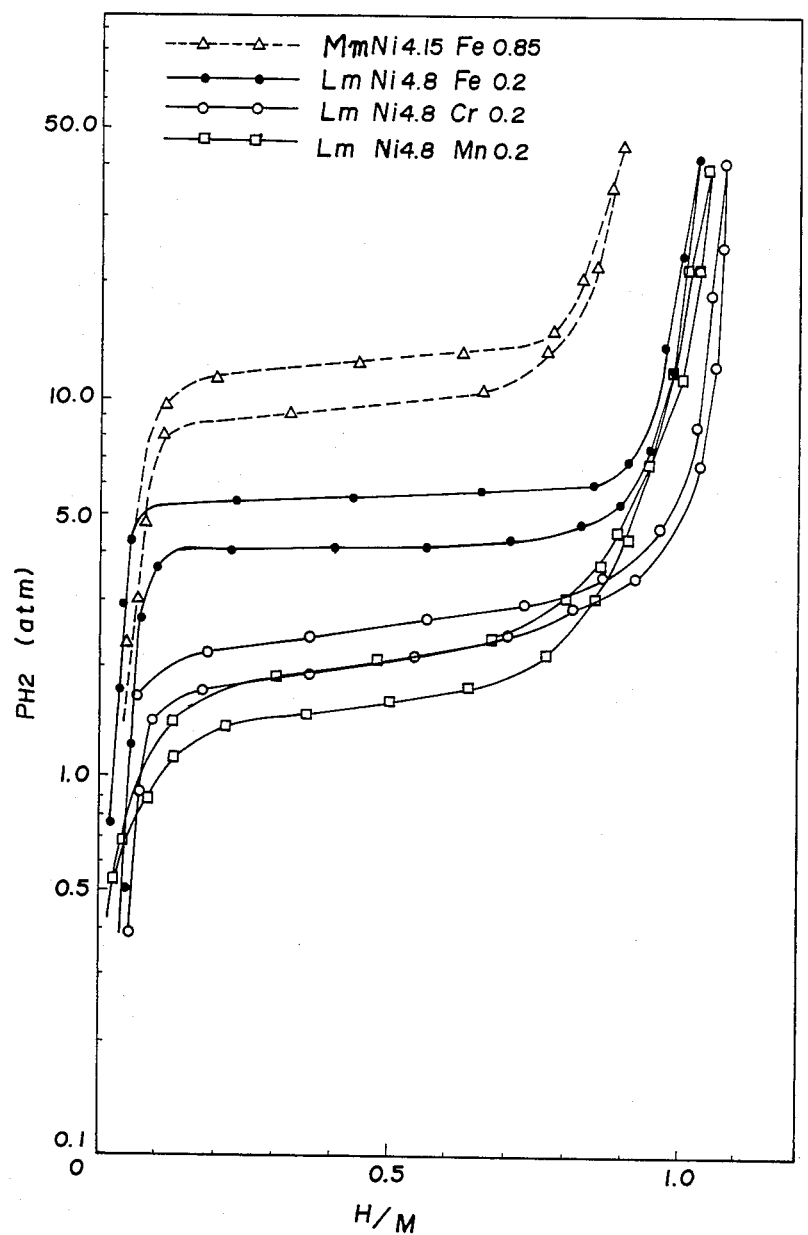

As apparent from FIG. 4, it was observed that the hydrogen absorption and desorption pressures of the $LmNi_{4.8}Mn_{0.2}$ alloy, $LmNi_{4.8}Fe_{0.2}$ and $LmNi_{4.8}Cr_{0.2}$ alloy were lower than that of the $MmNi_{4.15}Fe_{0.85}$ alloy and the hydrogen absorption amounts were larger than the latter.

Experiment Example 5

Figure 5:
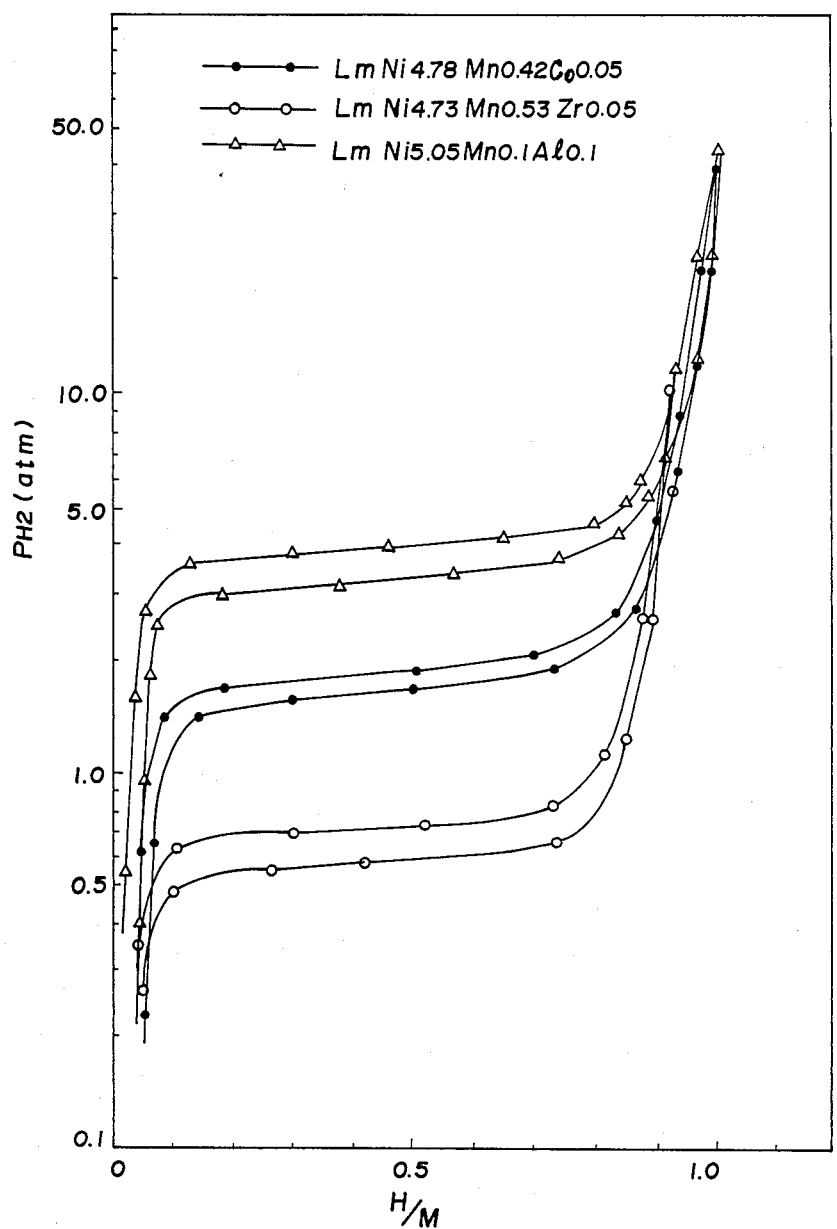

$LmNi_{4.78}Mn_{0.42}Co_{0.05}$ alloy which was produced by employing $Mn_{0.42}$ for Ay and $Co_{0.05}$ for Bz, $LmNi_{4.73}Mn_{0.53}Zr_{0.05}$ alloy which was produced by employing $Mn_{0.53}$ for Ay and $Zr_{0.05}$ for Bz, and $LmNi_{5.05}Mn_{0.1}Al_{0.1}$ alloy which was produced by employing $Mn_{0.1}$ for Ay and $Al_{0.1}$ for Bz, of the general formula $LmNi_{a-z}A_yB_z$, were produced in the same manner as in Experiment Example 3, PTC views at 30° C. were then obtained, and the results were as shown in FIG. 5.

As evident from FIG. 5, in case of the materials for storage of hydrogen of the general formula $LmNi_{a-x}A_yB_z$ it is observed that all could secure the same hydrogen absorption amounts as those of the materials of the general formula $LmNi_{a-x}A_x$, and the absorption and desorption pressures could be further decreased as compared with those of the materials of the general formula $LmNi_{a-x}A_x$.

Further, the hysteresis factors Hf of the $LmNi_{4.78}Mn_{0.42}Co_{0.05}$ alloy and $LmNi_{5.05}Mn_{0.1}Al_{0.1}$ alloy were respectively 0.12 and 0.20, and could be further decreased as compared with 0.32 of the hysteresis factor of the lanthanum pentanickel alloy.

Experiment Example 6

Figure 6:
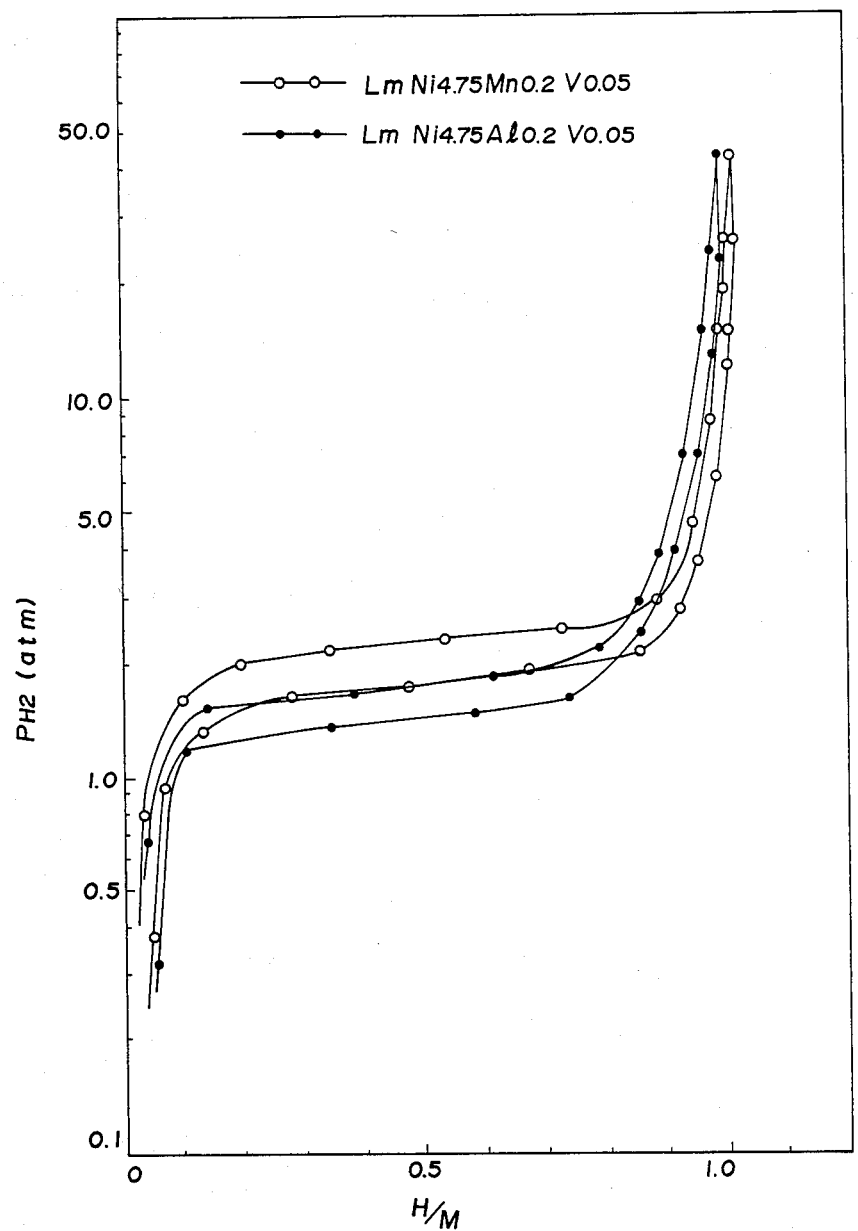

$LmNi_{4.75}Al_{0.2}V_{0.05}$ alloy which was produced by employing $Al_{0.2}$ for Ay and $V_{0.05}$ for Bz, and $LmNi_{4.75}Mn_{0.2}V_{0.05}$ alloy which was produced by employing $Mn_{0.2}$ for Ay and $V_{0.05}$ for Bz, of the general formula $LmNi_{a-z}A_yB_z$, were produced in the same manner as in Experiment Example 3, PTC views at 30° C. were then obtained, and the results were as shown in FIG. 6.

As evident from FIG. 6, all could secure the same large hydrogen absorption amounts those of the materials of the general formula $LmNi_{a-x}A_x$, and the absorption and desorption pressures could be further decreased as compared with those of the materials.

Further, the hysteresis factors Hf of the $LmNi_{4.75}Al_{0.2}V_{0.05}$ alloy and $LmNi_{4.75}Mn_{0.2}V_{0.05}$ alloy were respectively 0.20 and 0.18, and could be further decreased as compared with 0.32 of the hysteresis factor of the lanthanum pentanickel alloy.

As apparent from the above-described Experiment Examples, the hydrogen absorption amounts of the materials for storage of hydrogen, produced by adding a third element such as aluminum, manganese, iron or chromium to the rare earth-metal alloy and further adding a fourth element such as cobalt, zirconium or vanadium to the materials in addition to the third element, can be increased, the hydrogen absorption and desorption pressures of the materials can be decreased, the hysteresis of the materials can be reduced, the flatness of the plateau of the materials can be sufficiently obtained, and the materials for storage of hydrogen can be accordingly adapted for convertion energy.

It should be appreciated that, since the materials for storage of hydrogen of the invention can simply employ the raw material, from which the cerium is separated, without use of expensive lanthanum as in the lanthanum pentanickel alloy, they can be inexpensively produced, and the raw material can be readily obtained.

What is claimed is:

1. A material for storage of hydrogen, consisting essentially of an alloy represented by the formula:

$$LmNi_{a-x}A_x$$

wherein Lm represents rare earth metals which contain 40 to 70% by weight of lanthanum, 0.1 to 20% by weight of cerium and 10 to 59.9% by weight of a combination of neodymium, praseodymium and samarium;
A represents a metal selected from the group consisting of aluminum, manganese, iron and chromium;
a represents a range of $4.8 < a < 5.5$; and
x is from 0.01 to 2.0.

2. A material for storage of hydrogen, consisting essentially of an alloy represented by the formula:

$$LmNi_{a-x}A_yB_z$$

wherein Lm represents rare earth metals which contain 40 to 70% by weight of lanthanum, 0.1 to 20% by weight of cerium and 10 to 59.9% by weight of a combination of neodymium, praseodymium and samarium;
A and B represent different metals and A represents a metal selected from the group consisting of aluminum, manganese and iron;
B represents a metal selected from the group consisting of manganese, cobalt, zirconium and vanadium;
a represents a range of $4.8 < a < 5.5$; and
$x = y + z$, where y and z are from 0.01 to 2.0.

3. A material for storage of hydrogen, consisting essentially of an alloy represented by the formula:

$$LmNi_{a-x}A_x$$

wherein Lm represents rare earth metals which contain 40 to 70% by weight of lanthanum, 0.1 to 20% by weight of cerium and 10 to 59.9% by weight of neodymium, praseodymium and samarium; A represents a metal selected from the group consisting of aluminum, manganese, iron and chromium; a represents a range of $4.8 < a < 5.5$, and x is from 0.01 to 2.0.

4. A material for storage of hydrogen, consisting essentially of an alloy represented by the formula:

$$LmNi_{a-x}A_x$$

wherein Lm represents rare earth metals which contain 40 to 70% by weight of lanthanum, 0.1 to 20% by weight of cerium and 10 to 59.9% by weight of: samarium and at least one metal selected from the group consisting of neodymium and praseodymium; A represents a metal selected from the group consisting of aluminum, manganese, iron and chromium; a represents a range of $4.8 < a < 5.5$ and x is from 0.01 to 2.0.

5. A material for storage of hydrogen, consisting essentially of an alloy represented by the formula:

$$LmNi_{a-x}A_yB_z$$

wherein Lm represents rare earth metals which contain 40 to 70% by weight of cerium and 10 to 59.9% by weight of neodymium, praseodymium and samarium; A and B represent different metals and A represents a metal selected from the group consisting of aluminum, manganese and iron; B represents a metal selected from the group consisting of manganese, cobalt, zirconium and vanadium; a represents a range of $4.8 < a < 5.5$; and $x = y + z$, where y and z are from 0.01 to 2.0.

6. A material for storage of hydrogen, consisting essentially of an alloy represented by the formula:

$$LmNi_{a-x}A_yB_z$$

wherein Lm represents rare earth metals which contain 40 to 70% by weight of lanthanum, 0.1 to 20% by weight of cerium and 10 to 59.9% by weight of: samarium and at least one metal selected from the group consisting of neodymium and praseodymium; A and B represent different metals and A represents a metal selected from the group consisting of aluminum, manganese and iron and B represents a metal selected from the group consisting of manganese, cobalt, zirconium and vanadium; a represents a range of $4.8 < a < 5.5$; and $x = y + z$, where y and z are from 0.01 to 2.0.

* * * * *